United States Patent [19]
Presby et al.

[11] Patent Number: 5,234,296
[45] Date of Patent: Aug. 10, 1993

[54] ENDMILL ADAPTER WITH INTEGRAL COLLET

[75] Inventors: Thomas J. Presby; Victor D. Mogilnicki, both of Raleigh, N.C.

[73] Assignee: Kennametal Inc., Latrobe, Pa.

[21] Appl. No.: 893,133

[22] Filed: Jun. 3, 1992

[51] Int. Cl.⁵ .............................................. B23B 31/09
[52] U.S. Cl. ...................................... 409/234; 279/42; 279/900; 408/239 A
[58] Field of Search ................... 409/232, 234; 279/42, 279/43.9, 900; 408/239 A

[56] References Cited

U.S. PATENT DOCUMENTS

| | | | |
|---|---|---|---|
| 78,916 | 6/1868 | Babcock | 279/42 |
| 508,667 | 11/1893 | Woeber | 279/42 |
| 1,268,171 | 6/1918 | Spaulding | 279/42 |
| 1,702,810 | 2/1929 | Buhr | 279/97 |
| 2,380,330 | 7/1945 | Ringler | 279/42 |
| 2,842,020 | 7/1958 | Tarquino | 81/177 |
| 4,341,006 | 7/1982 | Staron | 29/434 |
| 4,421,443 | 12/1983 | Woythal et al. | 409/232 |
| 4,562,329 | 12/1985 | Minton | 279/42 X |

Primary Examiner—Z. R. Bilinsky
Attorney, Agent, or Firm—James G. Porcelli

[57] ABSTRACT

The present invention is a tool holder for receiving an endmill or similar tool. The tool holder includes a shank portion adapted to fit into the spindle of a machine, and a closed end collet integrally formed with the shank portion. The collet includes an axial bore for receiving the tool and a plurality of resilient collet segments for gripping the tool. The collet segments are separated by a plurality of axially extending slots which terminate inwardly from the forward end of a collet. A continuous tie ring extends around the forward end of a collet and joins the plurality of collet segments together. The continuous tie ring provides for increased radial stiffness at the forward end of the collet which improves accuracy and repeatability of tool location. A lock nut threads onto the collet to collapse the collet segments radially inwardly to grip the tool.

8 Claims, 2 Drawing Sheets

ENDMILL ADAPTER WITH INTEGRAL COLLET

The present invention relates generally to a tool holder for holding a cutting tool, such as an endmill, and more particularly to an endmill adapter having an integral collet, for receiving an endmill or similar tool.

BACKGROUND OF THE INVENTION

An endmill is a generally cylindrical cutting tool which has a plurality of cutting edges around its outer periphery. The endmill usually includes a cylindrical shank which fits into an axial bore of a tool holder. Various designs have been suggested for securing the endmill in the tool holder against axial movement and against rotation of the endmill with respect to the holder.

One method of securing the endmill within the holder is to use a set screw threadably engaged in the wall of the holder which can be tightened against a flat formed on the shank of the endmill. The use of a radial set screw, however, has some disadvantages. Most significantly, the radial set screw tends to push the endmill off center within the holder thereby effecting the accuracy of the endmill.

Another method which has been used is to employ a collet and chuck. A tapered collet having an axial bore for receiving the tool is pressed into a tapered bore in the tool holder by a lock nut. The collet is compressed into engagement with the tool. In theory, the collet collapses uniformally around its circumference so that the tool is accurately positioned at the center of the holder. A non-pullout wedge may be used in conjunction with the collet to prevent axial and rotational movement of the endmill. A collet arrangement of this type is disclosed in the patent to Staron, U.S. Pat. No. 4,341,006.

While widely used, the standard collet chuck has several drawbacks. First, the interfacing surfaces of the collet and chuck body must be accurately machined which increases the cost of producing the holder. Further, the cumulative tolerances between parts limit the degree of accuracy which can be obtained.

SUMMARY AND OBJECTS OF THE INVENTION

The present invention is an endmill adapter having an integral collet which is relatively inexpensive to manufacture and provides a relatively high degree of accuracy. The tool holder includes a shank for mounting the holder into the spindle of a machine. A closed-end collet is integrally formed with the shank and includes an axial bore for receiving the endmill or similar tool. The collet includes a plurality of resilient collet segments for gripping the tool separated by a plurality of axially extending slots. A continuous tie ring connects the plurality of collet segments together adjacent an outer end portion of the collet. The continuous tie ring provides greater rigidity at the outer end of the collet for improved accuracy. A lock nut is used for deflecting the collect segments radially inward to grip the tool.

In a preferred embodiment of the invention, a non-pullout wedge is incorporated into the collet to resist axial movement of the tool. The non-pullout wedge fits into an aperture formed in the walls of the collet and engages a notch in the shank of the endmill or similar tool. When the lock nut is threaded onto the collet, the wedge is trapped so that it cannot inadvertently disengage during a machining operation.

Based on the foregoing, it is a primary object of the present invention to provide a tool holder for holding an endmill or similar tool which is capable of accurately positioning the endmill within the holder.

Another object of the present invention is to provide a tool holder for an endmill or similar tool which can repeatably locate the tool at the same location with respect to the holder.

Another object of the present invention is to provide a tool holder for an endmill or similar tool which will prevent the axial or rotational displacement of the tool during a machining operation.

Another object of the present invention is to provide a tool holder for an endmill or similar tool which is relatively simple in construction and economical to manufacture.

Another object of the present invention is to provide an integral collet for a tool holder which will resist permanent deformation.

Other objects and advantages of the present invention will become apparent and obvious from a study of the following description and the accompanying drawings which are merely illustrative of such invention.

DETAILED DESCRIPTION OF THE INVENTION

Figure 1:
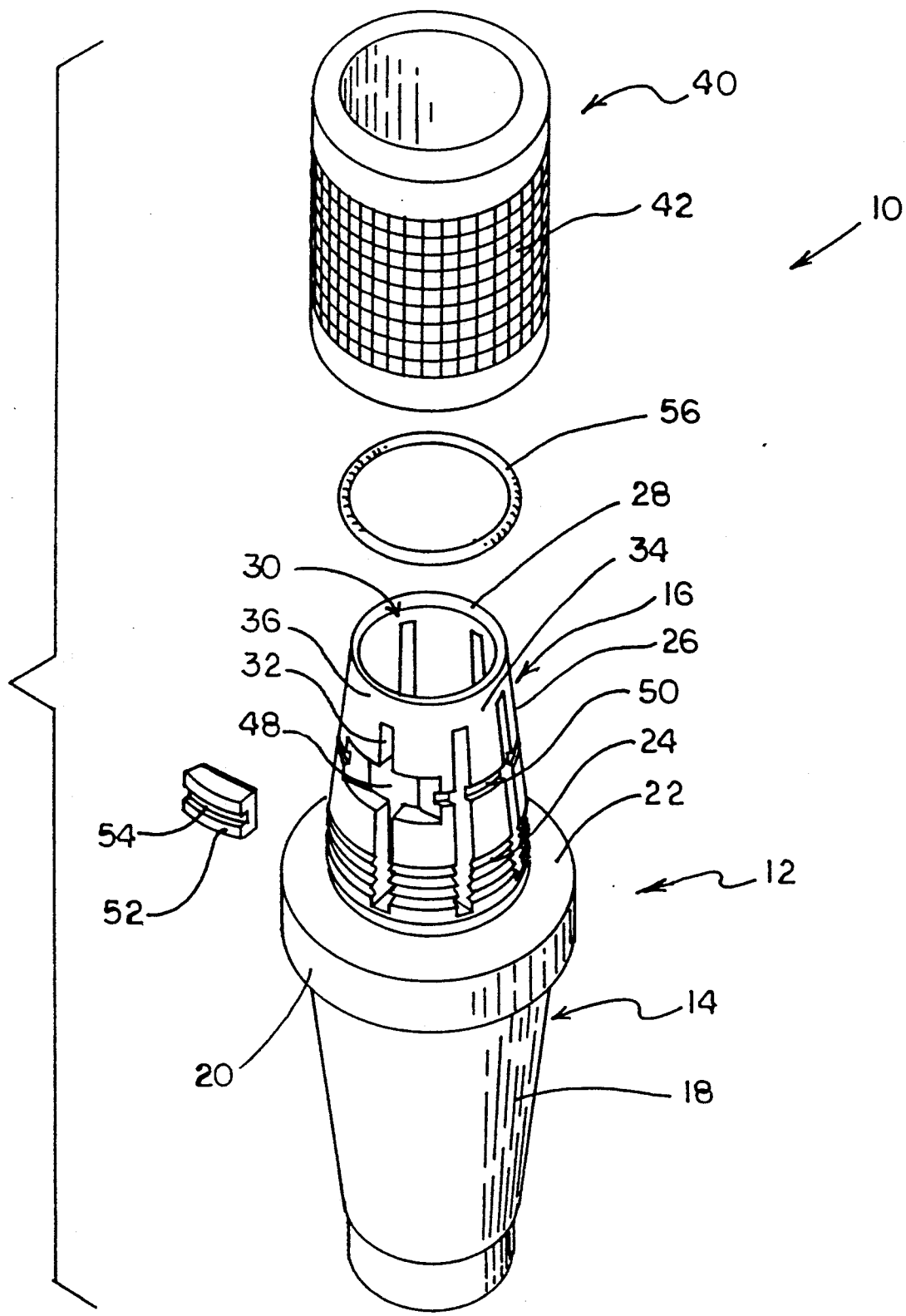
FIG. 1 is an exploded perspective view of the tool holder of the present invention.
Figure 2:
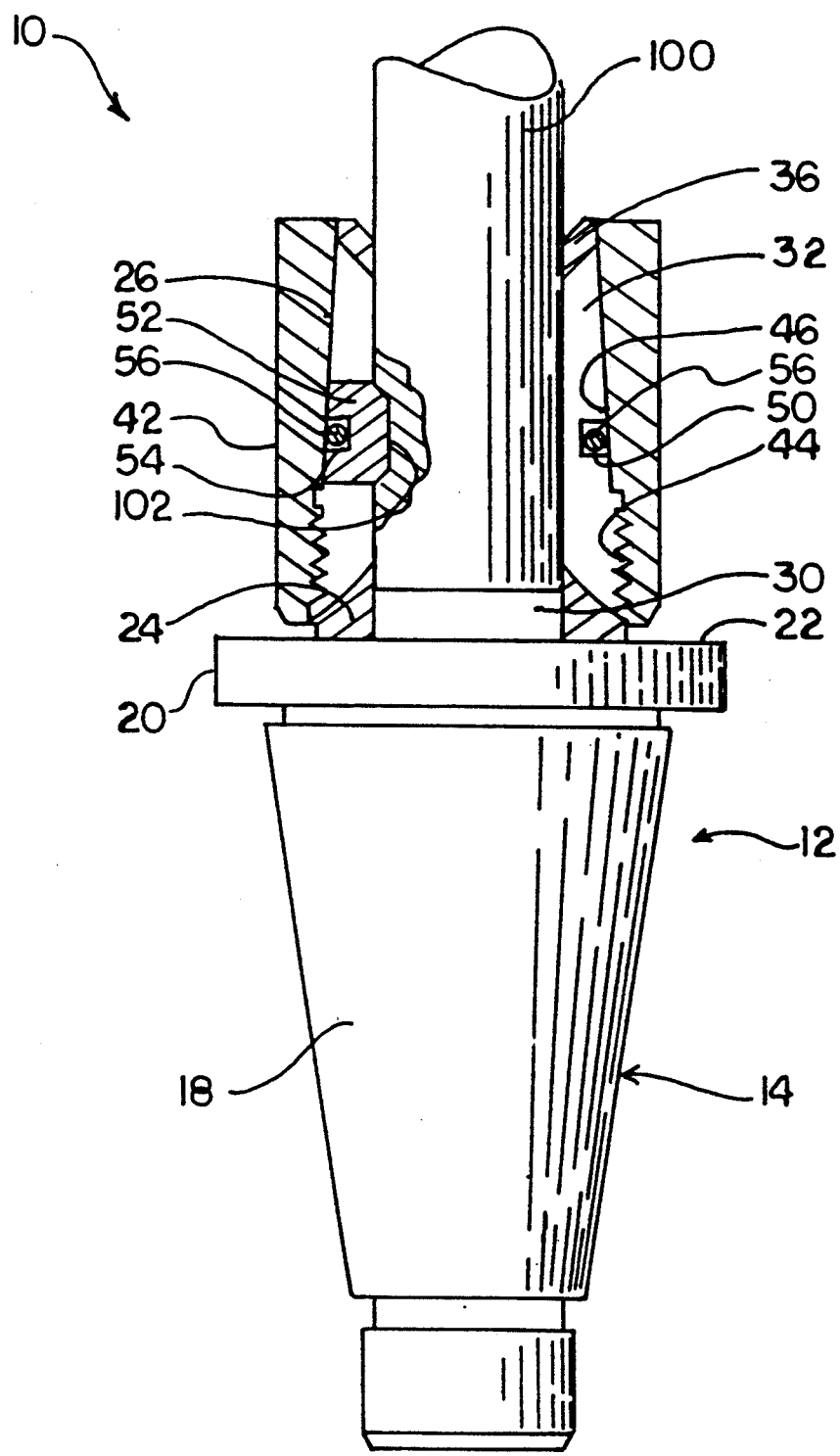
FIG. 2 is an elevational view of the tool holder with the collet portion shown in section.

Referring now to the drawings, the tool holder of the present invention is shown therein and indicated generally by the numeral 10. The tool holder 10 includes a main body 12 which includes a shank portion 14 and an integral collet portion 16. A tool 100, such as an endmill, is received in the collet portion 16 which is compressed into engagement with the tool 100 by a lock nut 40 as will be described in more detail below.

The shank portion 14 of the tool holder 10 includes a rearwardly extending tapered section 18 which fits into the spindle of a machine and an outwardly projecting flange 20 which seats against the face of the spindle. The collet portion 16 is integrally formed with the shank portion 14 and extends from the face 22 of the flange 20. The collet portion 16 includes a generally cylindrical base section 24 which is externally threaded. A tapered section 26 extends forwardly from the base section 24 and terminates at an outer-end 28.

A straight axial bore 30 is formed in the collet portion 16 for receiving the shank of the tool 100. The walls of the collet portion 16 are formed with a plurality of axially extending slots 32 which define a plurality of resilient collet segments 34. Each slot 32 terminates before reaching the end portion 28 of the collet 16. A continuous tie ring 36 extends circumferentially around the outer end portion 28 joins all the collet segments 34 together. The continuous tie ring 36 provides rigidity or radial stiffness to the outer end of the collet portion 16. For purposes of this application, radial stiffness means resistance to radial collapse. The increased rigidity or radial stiffness at the outer end 28 provides a greater degree of accuracy in locating the tool with respect to the holder 10.

A lock nut 40 screws into engagement with the collet portion 16 to compress the collet segments 34 radially inward to grip the tool. The lock nut 40 includes a generally cylindrical outer surface 42 which has a textured, non-slip surface which is easy to grip. The inner surface of the lock nut 40 includes a cylindrical bottom portion 44 which is internally threaded and a tapered top portion 46. The bottom portion 44 threadably engages the base section 24 of the collet portion 16. The top portion 46 is tapered to match the outer surface of the collet portion 16. When the lock nut 40 is tightened on the collet portion 16, the collet segments 34 are compressed radially inwardly into engagement with the shank of the tool 100.

The resistance to radial collapse of the collet segments 34 will be greater at the base portion 24 and the outer end 28 than at the center. As a result, the collet portion 16 will tend to grip the tool 100 along a circumferentially extending line near the center of each collet segment 34, rather than evenly along the length of the collet portion 16. To compensate for the uneven collapse of the collet segments 34 and to provide for more uniform gripping of the tool shank, the final machining of the axial bore 30 should be done with the lock nut 40 tightened on the collet portion 16. Since the final machining of the axial bore 30 is done with the collet segments 34 in a collapsed state, the axial bore 30 will be slightly convex with the collet segments 34 are in an expanded or non-collapsed position. The axial bore 30 should be straight when the collet segments 34 are compressed radially inward by the lock nut 40.

In the preferred embodiment of the invention, the collet portion 16 incorporates a non-pullout wedge 52 which engages the tool 100 to prevent axial movement of the tool 100 within the holder 10. The wedge 52 includes a flat locking surface which engages a notch 102 formed on the shank of the tool 100. The outer surface of the wedge 52 is curved and tapered to match the contour of the collet portion 16. The wedge 52 fits into a wedge aperture 48 formed in the wall of the collet portion 16. A groove 54 is formed in the outer surface of the wedge 52 which aligns with a circumferentially extending groove 50 in the collet portion 16. A resilient band 56 extends around the collet portion 16 within the groove 50 to retain the wedge 52 in the wedge aperture 48 when the lock nut 40 is removed. When the lock nut 40 is tightened on the collet portion 16 of the tool holder 10, the wedge 52 is pressed into the notch 102 on the tool shank 100. The engagement of the wedge 52 with the notch 102 prevents axial and rotational movement of the tool 100 with respect to the tool holder 10.

In use, the wedge 52 is inserted into the wedge aperture and the resilient band 56 is fitted into the circumferential groove 50 to loosely secure the wedge 52. The shank of the tool 100 is inserted into the axial bore 30 of the collet portion 16 and depressed downward. When the end of the tool 100 engages the wedge 52, the wedge 52 will be pushed outwardly. The tool 100 is pushed into the axial bore 30 until the notch 102 aligns with the wedge 52. The resilient band 56 will then cause the wedge 52 to engage in the notch 102 of the tool shank 100 and the lock nut 40 is then inserted over the end of the tool 100 and is threaded onto the collet portion 16. As the lock nut 40 is tightened, the collet segments 34 are compressed radially inward into engagement with the tool shank 100. The lock nut 40 also prevents the wedge 52 from backing out of the wedge aperture 48.

Due to the continuous tie 36 at the outer end 28 of the collet portion 16, the tool holder 10 of the present invention provides a high degree of accuracy and repeatability. The continuous tie ring 36 provides for greater radial stiffness at the outer end 28 of the collet 16 which results in greater accuracy. Further, the tool holder 10 of the present invention uses less parts than a standard collet chuck so that it can be made to stricter tolerances. The simplified construction also contributes to economy of manufacture.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

What is claimed is:

1. A tool holder for receiving and holding a tool comprising:
   (a) a shank for mounting the holder onto a machine;
   (b) closed-end collet integrally formed with the shank, said collet including an axial bore for receiving a tool and a plurality of resilient collet segments for gripping the tool separated by a plurality of axially extending slots, said collet further including a continuous tie ring extending around an outer end portion of the collet and joining said plurality of collet segments together; and
   (c) means for collapsing the collet segments radially inward to grip the tool inserted into the axial bore.

2. The tool holder of claim 1 further including a wedge aperture formed in the collet assembly, and a locking wedge insertable into the wedge aperture for engaging the tool to secure the endmill against axial and rotational movement with respect to the tool holder.

3. The tool holder of claim 2 further including a groove extending circumferentially around the collet and intersecting the wedge aperture, and a resilient ring fitted into the groove in the collet for retaining the wedge in the wedge aperture.

4. The tool holder of claim 1 wherein the collet is tapered.

5. The tool holder of claim 4 wherein the means for collapsing the collet segments includes a lock nut tapered to match the collet.

6. The tool holder of claim 5 wherein the collet includes an externally threaded section and wherein the lock nut includes an internally threaded section to threadably engage with the externally threaded section of the collet.

7. An endmill adapter for holding an endmill, comprising:
   (a) a shank for fitting into the spindle of an endmill;
   (b) a closed end collet assembly integral with the shank and projecting from the outer end thereof;
   (c) the collet assembly including a threaded base formed adjacent the shank and a collet section extending from the threaded base and having a plurality of circumferentially spaced, elongated collet segments separated by spaced apart, elongated slots;
   (d) the collet section including a continuous and uninterrupted closed outer terminal ring that joins the collet segments and extends across the ends of the slots separating the collet segments; and (e) a lock nut adapted to fit over the collet section and to threadably engage the base such that turning the lock nut downwardly onto the threaded base results in the collet section being collapsed and tightened around an endmill disposed within the collet section.

8. A tool holder having an integral collet assembly comprising:
   (a) a shank portion and a collet assembly integral with the shank portion;
   (b) the collet assembly including a series of circumferentially spaced elongated collet segments and a series of open slots formed between the respective collect segments, and a base interposed between the shank portion of the tool holder and the collet section;
   (c) attaching means formed on the base;
   (d) the collet assembly further including a continuous, uninterrupted, closed outer terminal ring joined with the collet segment and extending across the ends of the open slot to form a solid annular end terminal ring on the end of the collet section opposite the base; and
   (e) collet closure means for fitting over the collet section and connecting with the attaching means of the base for collapsing and tightening the collet section down onto a tool held within the collet section.

* * * * *